May 18, 1926.

B. F. SEYMOUR 1,585,121

VEHICLE CONSTRUCTION AND BODY SUSPENSION

Filed Nov. 26, 1923    6 Sheets-Sheet 1

Inventor
Benjamin F. Seymour
By
Attorney

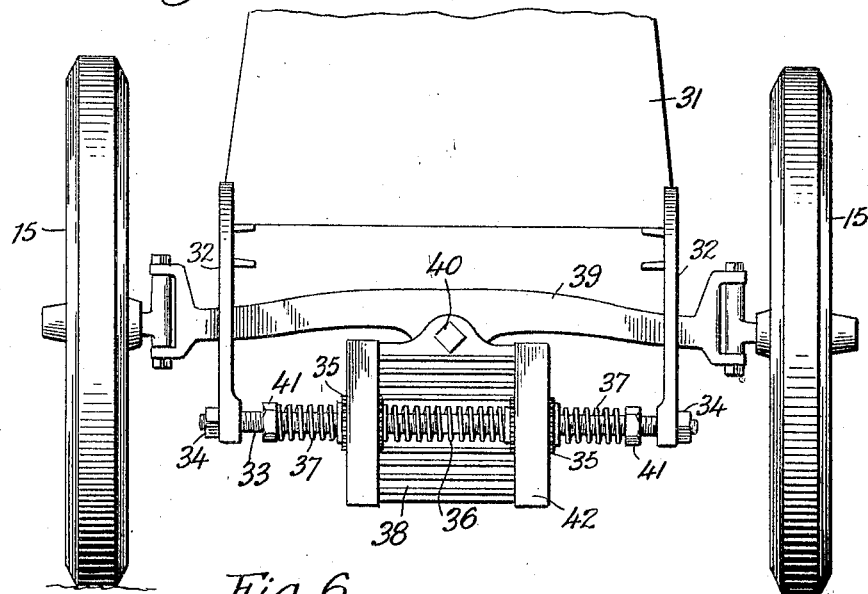
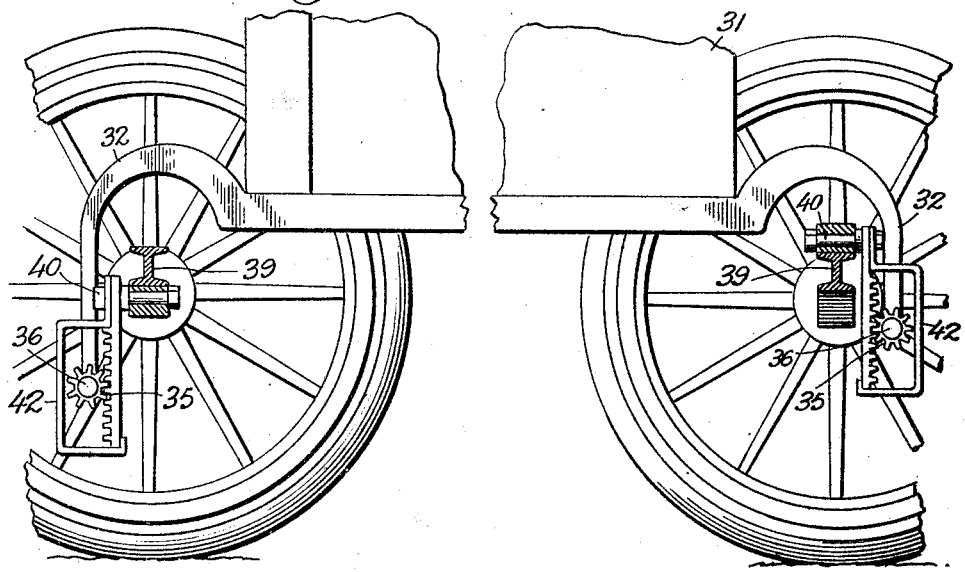

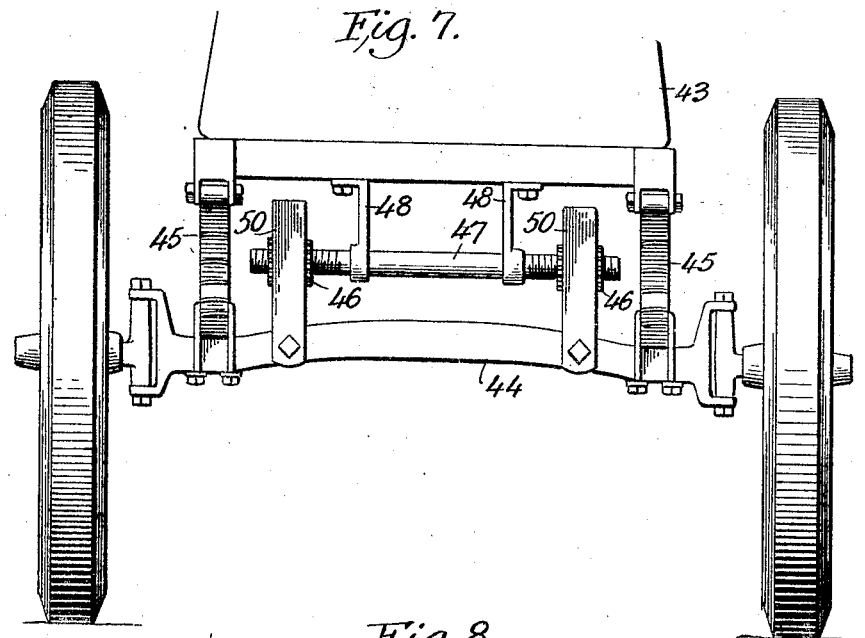
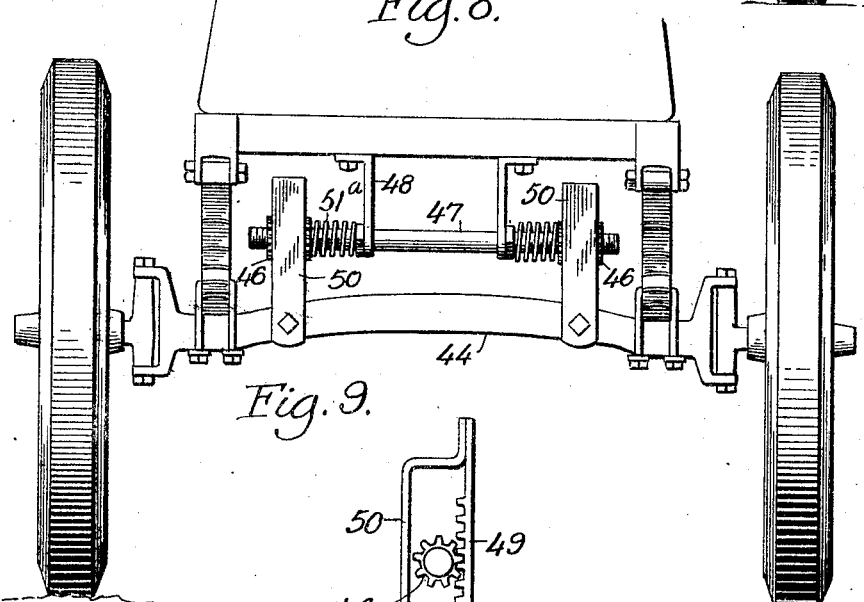
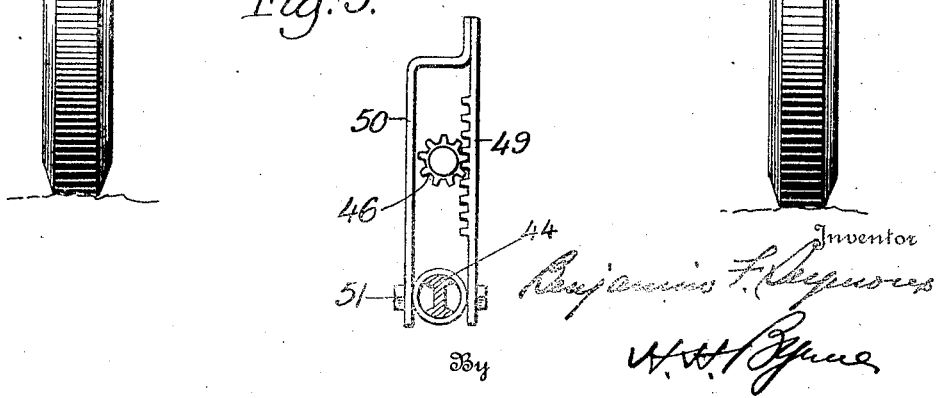

May 18, 1926.

B. F. SEYMOUR 1,585,121

VEHICLE CONSTRUCTION AND BODY SUSPENSION

Filed Nov. 26, 1923 6 Sheets-Sheet 4

Inventor
Benjamin F. Seymour
By
Attorney

May 18, 1926.
B. F. SEYMOUR
1,585,121
VEHICLE CONSTRUCTION AND BODY SUSPENSION
Filed Nov. 26, 1923  6 Sheets-Sheet 5
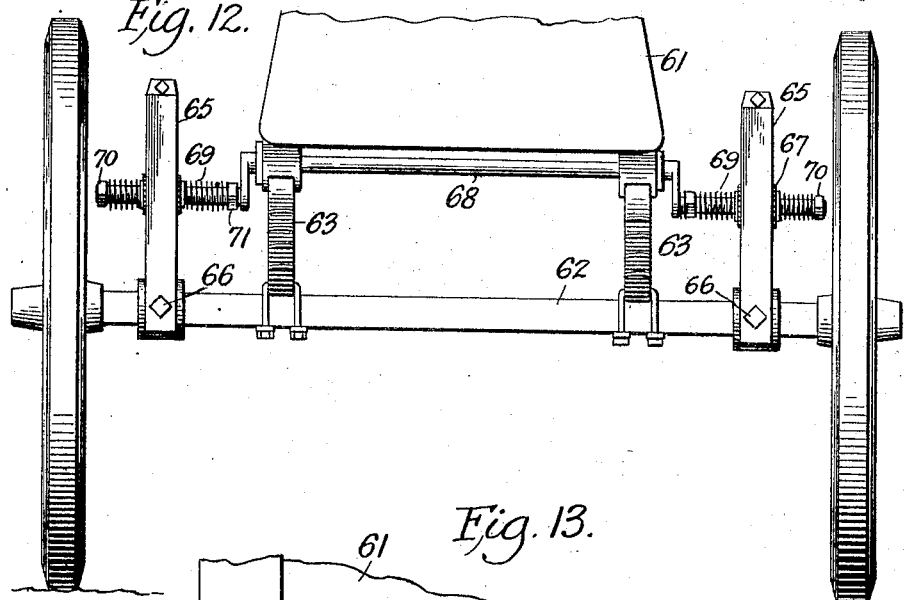
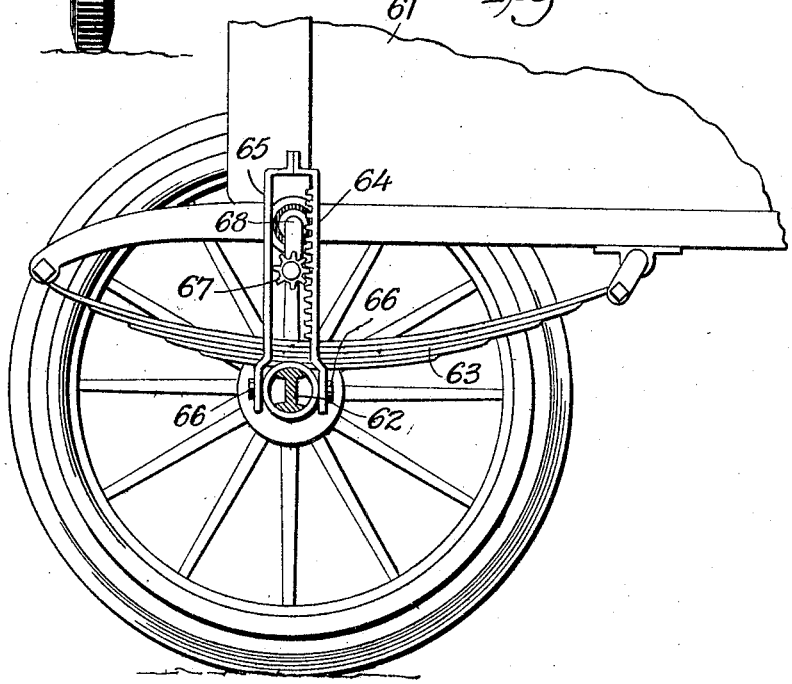

May 18, 1926. 1,585,121

B. F. SEYMOUR

VEHICLE CONSTRUCTION AND BODY SUSPENSION

Filed Nov. 26, 1923 6 Sheets-Sheet 6

Inventor
Benjamin F. Seymour
By H. H. Byrne
Attorney

Patented May 18, 1926.

1,585,121

UNITED STATES PATENT OFFICE.

BENJAMIN F. SEYMOUR, OF WASHINGTON, DISTRICT OF COLUMBIA.

VEHICLE CONSTRUCTION AND BODY SUSPENSION.

Application filed November 26, 1923. Serial No. 677,124.

The present invention relates to resilient suspensions for vehicle bodies, and consists in the combinations and arrangements of elements hereinafter described and particularly set forth in the accompanying claims.

The purpose of the invention is to provide the body of a vehicle, especially of the motor-driven type, with resilient means for indirectly absorbing and dissipating all shocks or jars to which the vehicle body is subjected, and without causing undue strain on either the wheel or its axle or transmitting excessive vibration to the supported load.

Another object of the indirect suspension as proposed herein is the employment of apparatus and disposal of the elements thereof in such a manner as will secure the maximum stability of the resilient sustaining structure, and equitable location or distribution of the resilient devices per se with regard to the body section or frame on which the same are mounted.

The different constructions herein shown are proposed as modifications or further improvements of those types of vehicle body suspensions forming the subject-matter of my co-pending applications for U. S. patents, to-wit: 365,037, filed March 11, 1920; 367,712, filed March 22, 1920; 390,825, filed June 22, 1920; 390,826, filed June 22, 1920; 430,694, filed Dec. 14, 1920; 471,240½, filed May 20, 1921; 667,319, filed Oct. 8, 1923.

Figure 1:
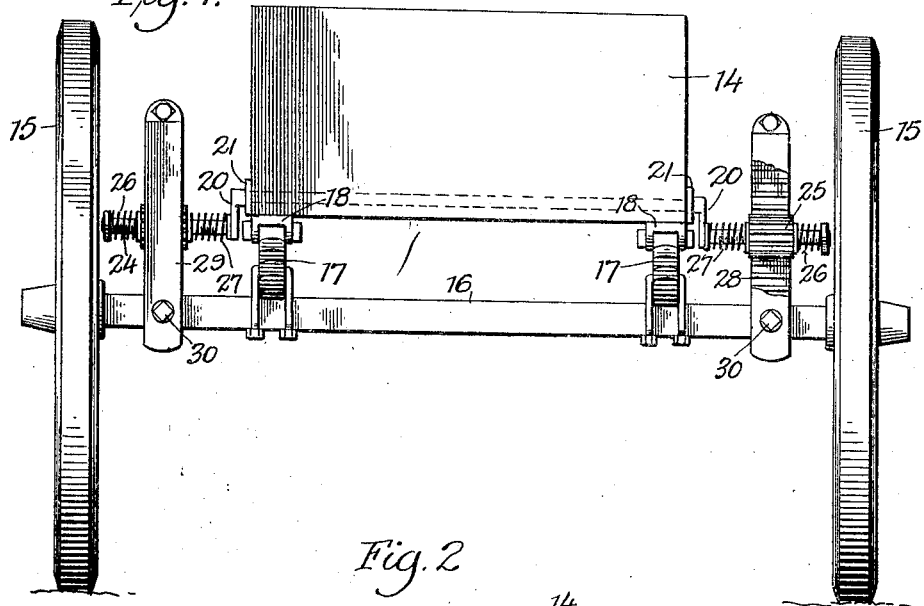

The invention is disclosed by way of illustration in the accompanying drawings, wherein:

Figure 1 is a rear and elevational view showing the application of the suspension to a vehicle.

Figure 2:
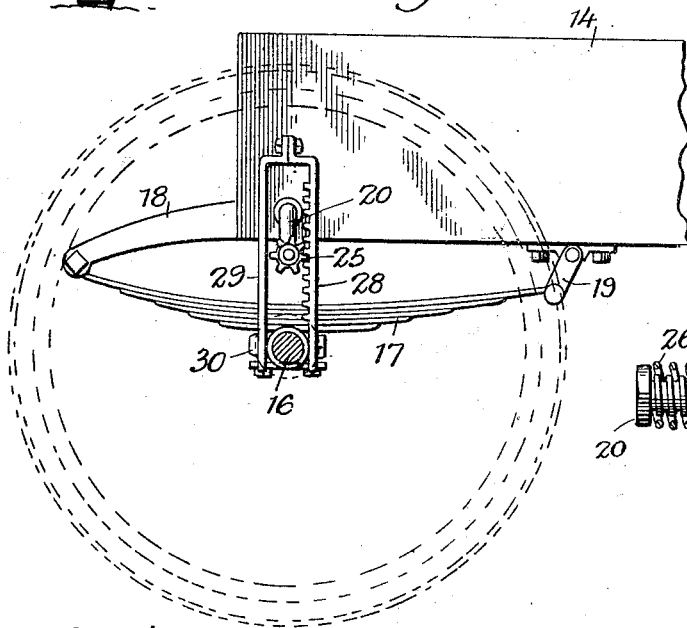

Fig. 2 a side elevational view thereof.

Figure 3:
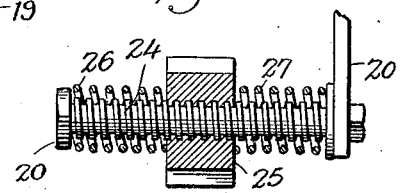

Fig. 3 a detail sectional view of the spring compressible element.

Figure 4:
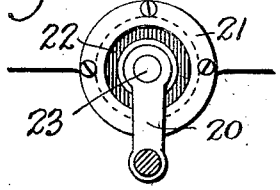

Fig. 4 a detail view of the rocking bar employed.

Fig. 5 a view similar to Fig. 1 of a modified construction.

Fig. 6 an elevational view showing the construction of Fig. 5 as applied to the front and rear axles of the vehicle.

Fig. 7 a view corresponding with Figs. 1 and 2, of a further modified construction.

Fig. 8 a similar view of another construction.

Fig. 9 a detail view of the rack and pinion element employed in Figs. 7 and 8.

Figure 10:
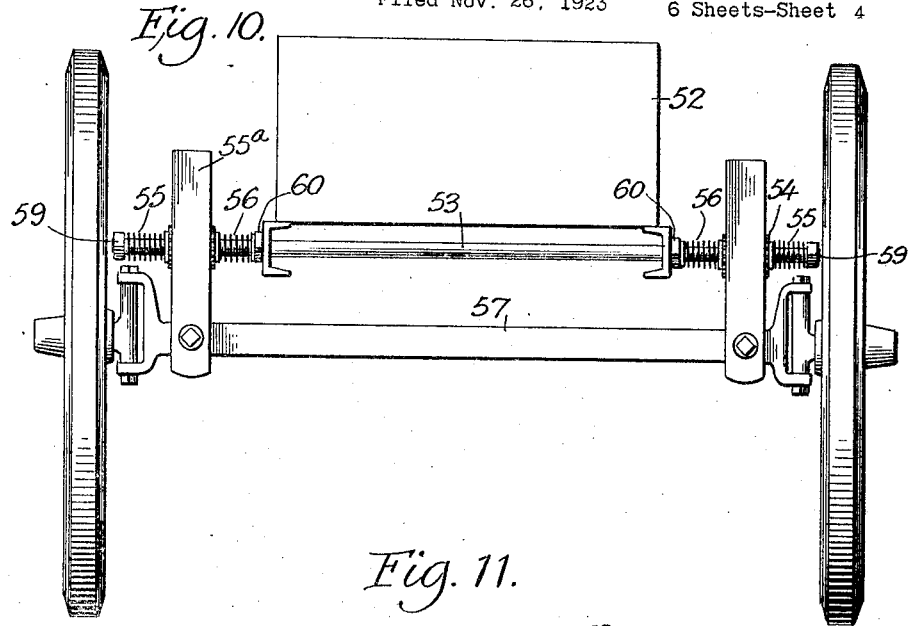

Fig. 10 an end elevational view of a further modification.

Figure 11:
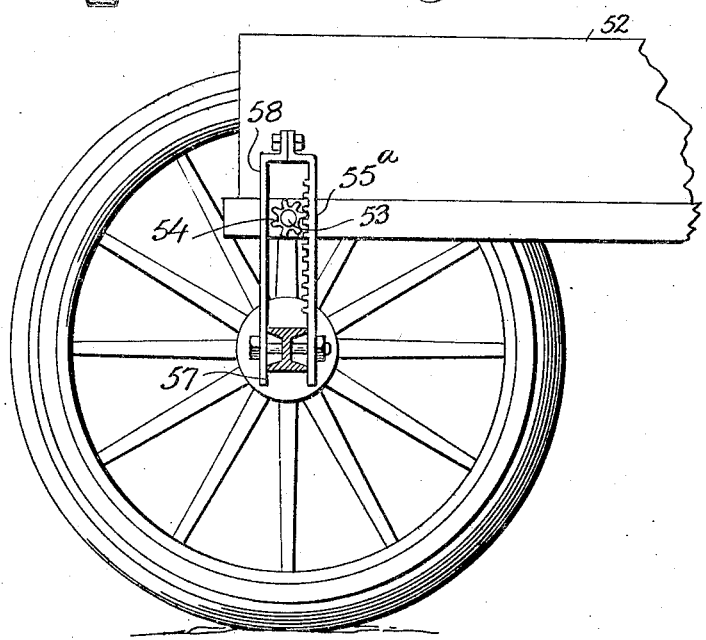

Fig. 11 a side elevational view thereof.

Fig. 12 an end elevational view of another construction.

Fig. 13 a side elevational view thereof, and

Figure 14:
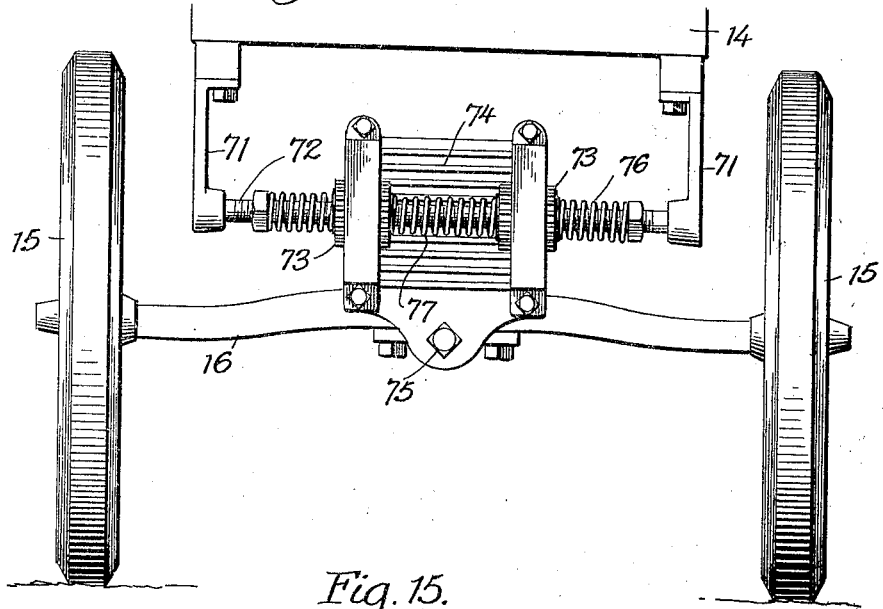
Figure 15:
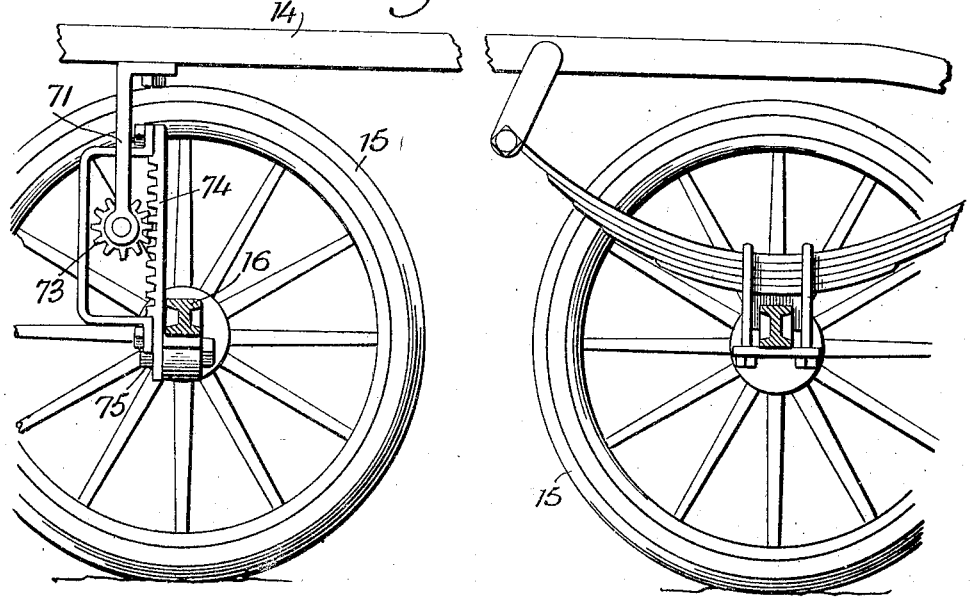

Figs. 14 and 15 show further modifications.

Referring to the construction in further detail, and wherein like reference characters designate corresponding parts in the different views shown, the apparatus consists of the body section or frame 14 of the vehicle having the usual wheels 15 journaled on the axle 16; and 17 designates a pair of elliptical springs, each supporting the body on the axle by a rearwardly projecting and rigid arm 18 and a pivoted or swinging link or toggle member 19 (see Fig. 2).

The auxiliary suspension more specially characterizing the present invention consists of laterally compressible resilient elements mounted on either side of the vehicle body and operable to function through forces imparted in a direction at right angles thereto. Each of said devices consists of a rocker arm 20 suitably journaled in the bearing 21 seated within the body or frame portion 14 (see Figs. 1 and 4). A resilient element 22, preferably of rubber, is interposed between the shaft 23 of the rocker arm and the bearing 21.

Each rocker arm 20 carries a laterally extending shaft portion 24 screw-threaded for substantially its entire length and threaded thereon is a pinion 25 adapted to cooperate with a pair of springs 26 and 27 located on either side thereof (see Fig. 3). The pinion 25 co-acts with a rack bar 28 forming a portion of the yoke or bracket 29 that is pivotally secured, as at 30, to the axle 16.

In operation any relative movement between the axle 16 and frame or body section 14 of the vehicle will cause turning of the pinion 25 through engagement with the rack 28 and accordingly, as the said pinion turns in one direction or the other, either of its cooperable springs 26 and 27 is compressed to dampen or take up the shock imparted to the wheel. The link 19 and rocker arm 20 provide for any swaying or endwise movement of the vehicle body section or frame 14.

Referring to the construction disclosed in Figs. 5 and 6:

The vehicle body or frame section 31 has suitably constructed and depending rigid arms 32 at either end thereof, and the arms at each end of the vehicle are connected by a shaft 33, suitably secured by bolts 34, said shaft 33 being oppositely screw-threaded from its middle portion and has threaded thereon the oppositely acting pair of pinions 35, and each of said pinions co-act with compressible spring elements 36 and 37 to the end that said springs are oppositely compressed through the working of the pinions toward or from each other.

A rack bar 38 in the form of a relatively wide plate is dependingly mounted on the axle 39 by the pivot bolt 40. It will be understood, of course, that the apparatus described herein is duplicated on each of the vehicle axles. The two pivotal bearings 40 are variant or in non-alinement, as clearly shown in Fig. 6. Instead of being dependingly mounted said rack bar 38 may be mounted in an upright position.

It will be noted that this construction and arrangement provides for withholding the body section or frame from side tilting or swaying, quite regardless of any simultaneous or independent tilting of the wheel axles; i. e., the frame or body section of the vehicle always remains level, though the axles may take any degree of rocking or tilting due to the roadway. For a further disclosure of this construction and principle of operation reference may be had to my co-pending application Serial No. 667,319 filed Oct. 8, 1923.

In the construction shown in Figs. 5 and 6 the tension on the several spring members 36 and 37 may be conveniently regulated by the nuts 41 adjustable on the shaft 33 and which provide the distal abutments for the outer pair of springs 37 (see Fig. 5). Each of the pinions 35 is provided with a guard in the form of a bar 42 that immediately overlies the pinion in the manner shown (Fig. 6). In this construction (i. e. Figs. 5 and 6) the spring elements 36 and 37 together with end cooperating pinions 35 provide the entire suspension for the vehicle frame or body section.

In the construction shown in Fig. 7 the body section or frame 43 is mounted on the axle 44 by the usual type of elliptical springs 45. In this development, however, the lateralwise movements, shocks, or vibrations imparted to the said frame or body section are steadied or equalized through the instrument of the pair of pinions 46 screw-threaded on the shaft 47, that is mounted on said frames or body section by the rigid arms 48. In lieu of having the pinions 46 screw threaded on said shaft said shaft may be smooth and the pinions journaled to freely rotate thereon. Each of said pinions 46 co-acts with a rack 49 after the manner described respecting the former constructions. Said rack 49 is mounted on a suitable bracket 50 fulcrumed on the knuckle joint 51 to the axle 44. It is obvious that in this construction one rack and one pinion centrally fulcrumed on the axle would accomplish the same purpose. In this instance the single rack and pinion would be located between the two rigid arms 48 instead of to either side of the same.

In the construction shown in Fig. 8 the arrangement is in essential respects the same as that shown in Fig. 7 characterized in that here the pinions 46 co-act respectively with springs 51ª having the usual tension regulating nuts as in the other constructions. With this arrangement said springs function to resiliently control the re-coil per se as imparted by the usual type of elliptical springs. It will be obvious that a single rack with two pinions and one spring between said pinions may accomplish the same results. With this arrangement the rack would be centrally mounted on the axle between the two rigid arms 48.

It will, therefore, be seen from the constructions shown in Figs. 7 to 9 that any relative action between the axle and the frame or body section will operate to bring the rack and pinion elements to function and thereby said frame will be steadied and the shocks or jars encountered appreciably diminished.

In the arrangement shown in Figs. 10 and 11 the frame or body section 52 has a transverse shaft 53 screw-threaded at its respective ends for the pinions 54, which in working thereon operate to compress either the outward pair of springs 55 or the inward pair 56, according as the movement of the body is away from or towards the axle 57. The pinions 54 co-act with racks 55ª pivotally mounted on axle 57, as shown. The tension on the spring elements 55 and 56 may be conveniently regulated by the abutments 59 and 60 screw-threaded on the shaft 53.

It will, therefore, be seen from this construction that the pinions 54 co-acting with springs 55 and 56 entirely support the vehicle frame or body section from the axle 57. And in operation said pinion withholds the frame or body section from lateral-wise tilting movement and the resiliency of said springs cushions all jars or vibration imparted to the vehicle wheels and same are taken up or dissipated in a direction at right angles to the force thus imparted.

In the construction shown in Figs. 12 and 13 the frame or body section 61 is directly mounted on the axle 62 by elliptical springs 63 substantially after the manner described in Figs. 1 and 2, and in substantially like manner is the resilient suspension constructed and functions. In this form, however, the rack bars 64 formed on yoke portions 65 are fulcrumed, as at 66, to the axle 62, to the end that said racks may function with their respective pinions 67 when there is an endwise or longitudinal movement of the body 61.

The shaft 68 extends across the body section 61 and has crank arm portions 69 suitably screw-threaded to receive the pinion 67. And abutments 70 and 71 screw-threaded on the portion 69 are adapted for regulating the tension of the spring members, as shown.

Referring to Figs. 14 and 15. The two rigid arms 71 support a lateral screw-threaded shaft 72 having pinions 73 threaded thereon. Said pinions mesh with rack 74 fulcrumed at 75 to axle 16. Springs 76 and 77 co-act with pinions 73 as in the other structures described.

It is obvious that those skilled in the art may vary the details of construction and arrangement of parts without departing from the spirit of my invention, and, therefore, I do not wish to be limited to such features except as may be required by the claims.

What is claimed as new is:

1. In a suspension for vehicle bodies, the combination with a frame, and an axle, of a hanger mounted on the body and including a shaft extending transversely of the body, springs fitted on the shaft, a pinion on said shaft cooperable with said springs, and a rack fulcrumed on the axle and cooperable with said pinion.

2. In a resilient construction and suspension for vehicle bodies, the combination with a frame, an axle, and a wheel journalled on the axle, of a screw-threaded shaft laterally mounted on the vehicle body, a pair of springs fitted on said shaft, a pinion threaded on the shaft co-operable with said springs, and a rack fulcrumed on the axle co-operable with said pinion, substantially as set forth.

3. In a resilient construction and suspension for vehicle bodies, the combination with a frame, an axle, and a wheel journalled on the axle, of a rocker shaft journalled transversely on the frame, a compressible element mounted on said shaft, a pinion associated with the compressible element, and a rack fulcrumed on the axle co-operable with said pinion, substantially as set forth.

4. In a resilient construction and suspension for vehicle bodies, the combination with a frame, an axle, and a wheel journalled on the axle, of a rocker shaft journalled on the frame, a compressible element mounted on said shaft, a pinion screw threaded on the rocker shaft operable to compress said compressible element, and a rack mounted on the axle co-operable with said pinion, substantially as set forth.

5. In a resilient construction and suspension for vehicle bodies the combination with an axle, a frame mounted to have limited rocking movement thereon lengthwise of the vehicle, and a wheel journalled on the axle, of a rocker shaft journalled transversely on the frame, an element mounted on said shaft and compressible in axial direction thereof, a pinion associated with the compressible element, and a rack mounted on the axle co-operable with said pinion, substantially as set forth.

6. In a resilient construction and suspension for vehicle bodies the combination with a frame, an axle, and a wheel journalled on the axle, of a shaft mounted transversely on the frame, opposed resilient elements mounted on the shaft and adapted for compression in axial direction thereof, a pair of pinions associated with said opposed compressible elements and a rack fulcrumed on the frame co-operable with said pinions, substantially as set forth.

7. In a resilient construction and suspension for vehicle bodies the combination with a frame, an axle, springs between the frame and axle, and wheels journalled on the axle, of a screw threaded shaft mounted on the frame, opposed pinions threaded on said shaft, and racks mounted on the axle co-operable with said pinions, substantially as set forth.

8. In a resilient construction and suspension for vehicle bodies the combination with a frame, an axle, springs between the frame and axle, and wheels journalled on the axle, of a screw threaded shaft mounted on the frame, opposed pinions threaded on said shaft, spring elements associated with said pinions respectively, and racks mounted on the axle co-operable with said pinions, substantially as set forth.

9. In a resilient construction and suspension for vehicle bodies the combination with an axle, wheels journalled on the axle, a frame mounted to have limited rocking motion on the axle lengthwise of the vehicle, screw threaded rocker arms journalled on the frame, pinions threaded on said rocker arms, springs associated with said pinions, and rack-bars fulcrumed on the axle co-operable with said pinions, substantially as set forth.

In testimony whereof I affix my signature.

BENJAMIN F. SEYMOUR.